United States

Barnes, Jr. et al.

[11] 3,785,819

[45] Jan. 15, 1974

[54] METHOD FOR PHOTOGRAPHICALLY PREPARING ANAMORPHIC PICTURES

[75] Inventors: Clarence A. Barnes, Jr., New York, N.Y.; Alan Fontaine, Westport, Conn.

[73] Assignee: Reflectomorphics, Inc., New York, N.Y.

[22] Filed: Mar. 15, 1972

[21] Appl. No.: 234,723

[52] U.S. Cl. ............ 96/46, 96/27 R, 350/181, 355/45, 355/49, 355/52, 355/66
[51] Int. Cl. ............................................. G03c 11/00
[58] Field of Search .............. 96/46, 27; 350/181, 350/182, 184, 202, 203; 355/52, 44, 45, 47, 49, 51, 52, 66; 353/122

[56] References Cited
UNITED STATES PATENTS

| | | | |
|---|---|---|---|
| 3,165,969 | 1/1965 | Gunn | 355/52 |
| 2,995,066 | 8/1961 | Dufresse | 350/181 |
| 3,240,113 | 5/1966 | Stecnemesser et al. | 350/198 |
| 3,238,909 | 3/1966 | Kendall | 96/46 |
| 3,580,660 | 5/1971 | Russa | 350/181 |
| 3,532,425 | 10/1970 | Silverberg | 355/52 |
| 3,644,037 | 2/1972 | Larraburu | 355/52 |
| 2,792,746 | 5/1957 | O'Brien | 88/24 |

OTHER PUBLICATIONS

"The Focal Encyclopedia of Photography," Desk Edition, McGraw–Hill Book Co., pp. 42–43.

*Primary Examiner*—Norman G. Torchin
*Assistant Examiner*—Edward C. Kimlin
*Attorney*—Lee C. Robinson, Jr.

[57] ABSTRACT

A method for photographically preparing anamorphic pictures in which a true image of the picture to be prepared is projected through a dioptric lens system onto a curved reflected surface having an axis of curvature which is substantially perpendicular to the projected axial ray. An anamorphic reproduction of the image is reflected from the curved surface onto an opaque or translucent planer surface normal to the axis of curvature, and the planar surface is photographed from a direction parallel to the axis. In some embodiments the curved surface is cylindrical, while in other cases the surface is of conical configuration and the direction of the projected image is changed such that its axial ray is coaxial with the cone at the time the image reaches the surface.

14 Claims, 5 Drawing Figures

METHOD FOR PHOTOGRAPHICALLY PREPARING ANAMORPHIC PICTURES

BACKGROUND OF THE INVENTION

This invention relates to the photographic preparation of anamorphic pictures and more particularly to a method for producing anamorphic photographs through the use of controlled interactions between dioptric and catoptric optical systems.

As is well known, anamorphic pictures comprise images which have been distorted to such an extent that they are unrecognizable unless viewed with a proper restoring device such as a cylindrical or conical mirror. Early methods of making anamorphic pictures took a great deal of time on the part of the artist and very precise planning. In some cases, for example, the distorted image was mechanically projected line by line from a picture of normal proportions. More recently, attempts have been made to produce the anamorphic reproduction through the use of optical techniques, and the artist would trace or otherwise form the distorted drawing from the true image.

Heretofore, difficulties were encountered in the preparation of accurate anamorphic pictures on anything other than a piece-meal basis. As an illustration, efforts to produce such pictures through the use of photographic techniques often resulted in a picture of poor fidelity, particularly upon the restoration of the picture to its normal proportions when viewed with a cylindrical or conical mirror. In addition, the preparation of the pictures commonly required an inordinate amount of time, and the pictures were difficult and expensive to mass produce. For these and other reasons, prior techniques for preparing anamorphic pictures were not readily adaptable for large scale commercial utilization.

SUMMARY

One general object of this invention, therefore, is to provide a new and improved method for the photographic preparation of anamorphic pictures.

Another object of this invention is to provide such method which results in substantially improved fidelity of the reconverted image.

A further object of the invention is to provide a method of the character indicated in which the anamorphic reproductions may be readily mass produced in a simple and inexpensive manner.

In one illustrative embodiment of the invention, a true image of the picture to be reproduced is projected through a dioptric lens system onto a curved reflective surface. An anamorphic reproduction of the image is reflected from the curved surface onto a planar surface which is uniquely oriented relative to the curved surface. The planar surface is then photographed to produce the anamorphic picture.

In accordance with one feature of several advantageous embodiments of the invention, the axial ray of the projected image is substantially perpendicular to the axis of curvature of the reflective surface. With this arrangement, the system avoids unwanted distortion which would otherwise be introduced into the anamorphic reproduction as a result of improper angular orientation between the projected image and the surface.

In accordance with another feature of the invention, in certain important embodiments, the planar surface is positioned such that it is normal to the axis of the curved surface at all times. In some cases the planar surface is photographed from the same side that receives the anamorphic image, while in other arrangements a translucent planar surface is employed and the anamorphic image is reflected onto one side of the surface and is photographed from the opposite side. The arrangement is such that the anamorphic reproduction is prepared in an extremely rapid and simplified manner.

In accordance with a further feature of the invention, in certain preferred arrangements, the anamorphic image on the planar surface is photographed from a direction parallel to the axis of the curved surface. As a result, any unwanted distortion in the image is further reduced.

The present invention, as well as further objects and features thereof, will be understood more clearly and fully from the following description of certain preferred embodiments, when read with reference to the accompanying drawings.

DESCRIPTION OF CERTAIN PREFERRED EMBODIMENTS

Figure 1:
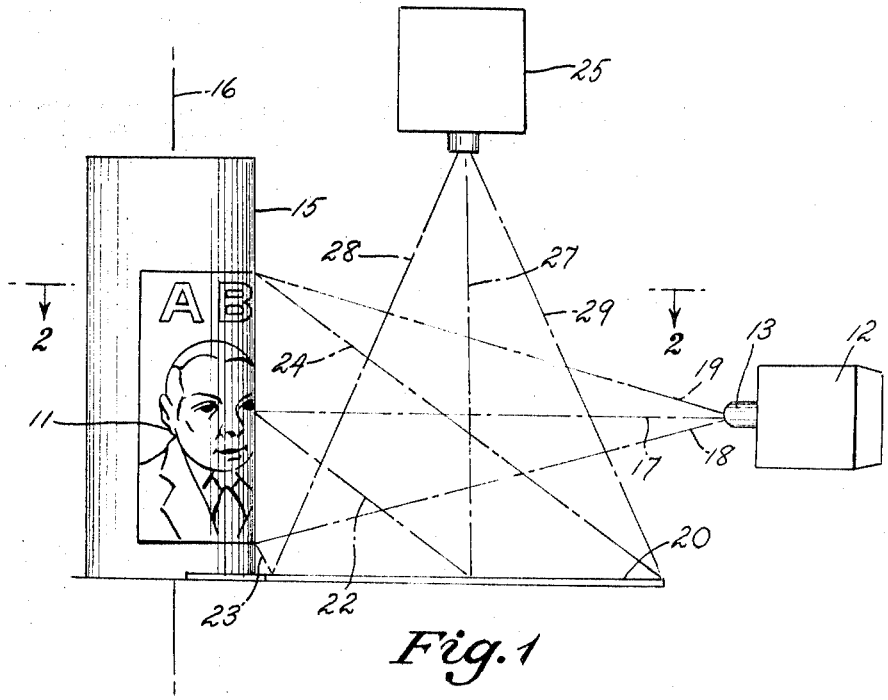
FIG. 1 is a schematic representation of the equipment used to form a photographic reproduction of an anamorphic image in accordance with the method of one illustrative embodiment of the invention.
Figure 2:
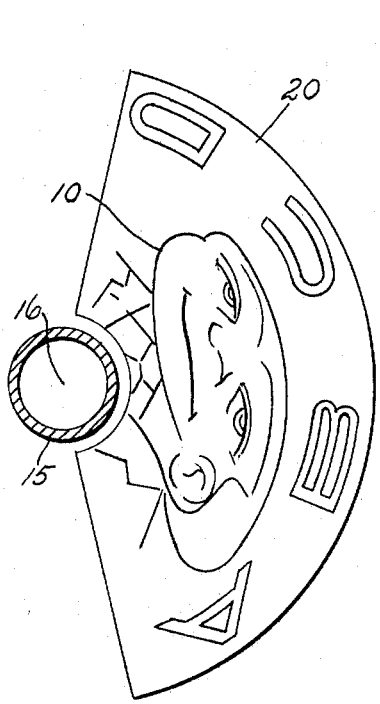
FIG. 2 is a sectional view taken along the line 2—2 in FIG. 1.

Referring to FIGS. 1 and 2 of the drawings, there is shown a system for preparing an anamorphic reproduction 10 from a true image 11 of the subject. For purposes of clarity and ease of illustration, the anamorphic reproductions shown in the drawings are less distorted than would usually be the case. To prepare the true image, the subject is first photographed in the normal manner, and a photographic slide or transparency of convenient size is produced. This transparency illustratively may comprise a standard 35 mm. slide, in either full color or black and white. In cases in which it is desired to create moving anamorphic reproductions, suitable motion picture film is used to produce the transparency.

The photographic slide is inserted in a projector shown schematically at 12. The projector 12 includes a dioptric lens system 13 which is arranged to direct a true image of the subject through a suitable pinhole opening in the projector onto the curved surface of a right cylindrical mirror 15 having an axis of curvature 16. The projected image is illustrated schematically in FIG. 1 by an axial ray 17 and two side rays 18 and 19.

The axial ray 17 of the projected image is maintained in a direction which meets the axis 16 of the cylindrical mirror 15 at a right angle. Although this angle may vary slightly from precisely 90°, any substantial change in the angle introduces unwanted aberrations which are reproduced when the anamorphic reproduction is again converted into a true image. In addition, the intensity of the reproduction decreases as the projector is tilted in a direction to increase the angle (clockwise, as viewed in FIG. 1), and if the intensity becomes too low the reproduction is too indistinct to have much practical application. For best results the angle between the projected axial ray 17 and the cylindrical axis 16 should be not less than about 70° and not more than about 110°.

The cylindrical mirror 15 is located on a white planar surface 20 in a dark room or suitable tent arrangement, so that no extraneous light interferes with the making of the anamorphic reproduction. It will be noted that the plane of the surface 20 is maintained normal to the cylindrical axis 16 at all times. The light from the projector 12 which strikes the cylindrical surface of the mirror 15 is reflected catoptrically in all directions about the axis 17 of the projected image. A portion of the reflected light, represented by a principal ray 22 and two side rays 23 and 24, is directed onto the surface 20 to produce the anamorphic image 10.

The anamorphic image 10 on the planar surface 20 is photographed by a camera 25. The camera 25 is located above and to one side of the cylindrical mirror 15 such that the light from the camera, shown schematically by an axial ray 27 and two side rays 28 and 29, strikes the surface 20 in close proximity to the intersection between the surface 20 and the curved surface of the mirror. To further reduce the possibility of unwanted aberrations in the image, the axial ray 27 from the camera is maintained parallel to the cylindrical axis 16. As used herein and in the appended claims, the term "parallel" is intended to encompass axes that are coincident as well as those in spaced parallel relationship with each other.

The film from the camera 25 is developed in the usual manner, and positive anamorphic prints are made from the photographic negative. It will be apparent that these prints may be rapidly and inexpensively mass produced in accordance with conventional photographic techniques to provide substantially any desired number of anamorphic reproductions.

When a cylindrical mirror is placed in the correct position on the anamorphic reproduction and the mirror is viewed from a direction normal to the cylindrical axis, the image takes on its true proportions. The viewing mirror is located on the reproduction in the same relative orientation as the mirror 15 (FIG. 2) bears to the planar surface 20. In cases in which the viewing mirrors is disposed on the surface of a cylindrical column of a building or other architectural structure, for example, the anamorphic print is placed on the floor or ground adjacent the column, and passers-by observe the reconverted true image on the cylindrical surface. The anamorphic reproductions also may be employed in many other fields, including publishing, advertising, home furnishings, display devices, marquetry, mosaics, games, toys, greeting cards, etc. As an illustration, the reproductions may be placed on such utilitarian articles as cocktail trays and viewed by observing the cylindrical reflective surface of a tumbler, cocktail shaker or similar article on the tray.

In a typical example of the method in accordance with the embodiment of FIGS. 1 and 2, the cylindrical mirror 15 has a radius of 1.0 inches, and the distance between the reflective surface and the focal plane of the projector 12 is 10.0 inches. The projector 12 is located so that the projected axial ray 17 strikes the reflective surface 2.0 inches above the planar surface 20, and the focal plane of the camera 25 is positioned 18.0 inches above the planar surface. The horizontal distance between the cylindrical axis 16 and the axial ray 27 from the camera is 4.0 inches. These distances are of course illustrative and will depend on such factors as the type of film employed, the lens openings and shutter speeds of the camera and the projector, the desired size of the anamorphic reproduction, etc.

Figure 4:
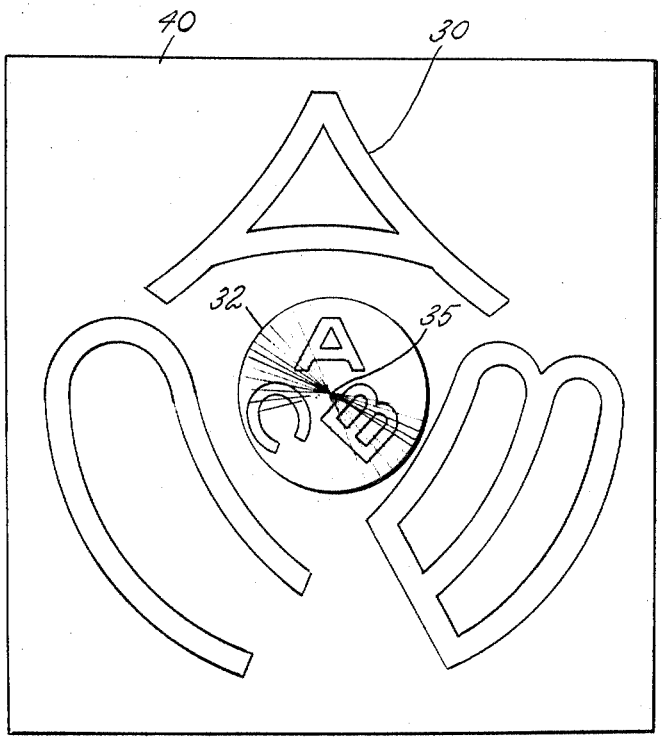
FIG. 4 is a plan view of a portion of the equipment of FIG. 3 as seen from the line 4—4 in that figure.
Figure 3:
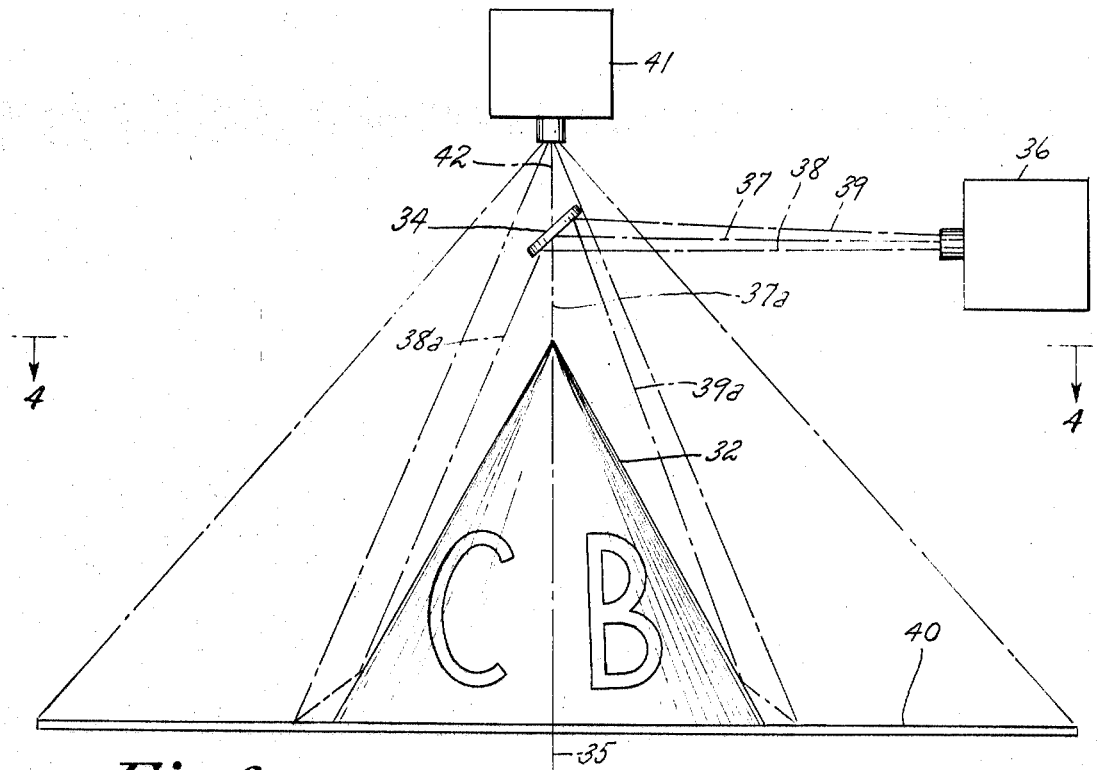
FIG. 3 is a schematic representation of the equipment used to form an anamorphic image in accordance with the method of another illustrative embodiment of the invention.

FIGS. 3 and 4 are illustrative of the equipment used in preparing an anamorphic reproduction 30 in accordance with the method of another preferred embodiment of the invention. The equipment includes a right circular cone 32 having a distinct, comparatively sharp vertex. This vertex as well as the remaining portion of the conical surface is of reflective material. A small planar mirror 34 is located directly above the vertex of the cone 32 in spaced relationship therewith and is oriented at a 45° angle with respect to the conical axis 35. The mirror 34 is of circular configuration and is coaxial with the cone.

A slide projector 36 is arranged to direct a true image of the picture to be prepared toward the mirror 34. The projected image comprises an axial ray 37 and two side rays 38 and 39, and the projector 36 is oriented with respect to the cone 32 such that the axial ray 37 and the conical axis 35 are perpendicular. The mirror 34 is effective to change the direction of the projected image ninety degrees with the result that the axial ray 37 is coaxial with the cone 32 at the time the image reaches the conical surface. This coaxial relationship should be fairly precise for best results, and if the axial ray becomes offset even slightly from the conical axis serious unwanted distortion may be introduced into the final image. The side rays 38a and 39a reach the conical surface of the cone in close proximity with its base.

The base of the cone 32 is located on a white planar surface 40. The surface 40 is oriented in a plane normal to the conical axis 35 in position to receive reflected light from substantially the entire surface of the cone, thus forming the anamorphic reproduction 30 (FIG. 4). The reproduction 30 is of annular configuration and surrounds the base of the cone in close proximity therewith.

A camera 41 is disposed above the cone 32 such that the axial ray 42 from the camera is coincident with the conical axis 35. The camera 41 photographs the anamorphic reproduction 30 on the surface 40, and included in the photograph is the back surface of the mirror 34, which preferably has a black non-reflective coating, and a portion of the conical surface. When prints are made from the photographic negative, the periphery of the base of the cone appears in the centers of the prints and provides a convenient locating point for the viewing mirror. The viewing mirror likewise is of conical configuration and advantageously is of the same dimensions as the cone 32.

In the embodiment of FIGS. 3 and 4, the conical axis 35, the projected axial ray 37a from the mirror 34 and the axial ray 42 from the camera 41 are coaxial, and the camera photographs the same side of the planar surface 40 that receives the anamorphic image from the cone 32. In other advantageous arrangements, the coaxial relationship between the conical axis, the projected axial ray and the axial ray from the camera is maintained, but the planar surface is photographed from a side opposite that which receives the anamorphic image. In the embodiment illustrated in FIG. 5, for example, there is shown a planar surface 45 of frosted glass, plastic or other translucent material. The conical mirror 32 is positioned on one side of the surface 45, and the camera 41 is disposed in spaced relationship with the opposite side of the surface. The projector 36 is spaced from the apex of the cone, such that the projector, the cone and the camera are all in coaxial relationship with one another.

Figure 5:
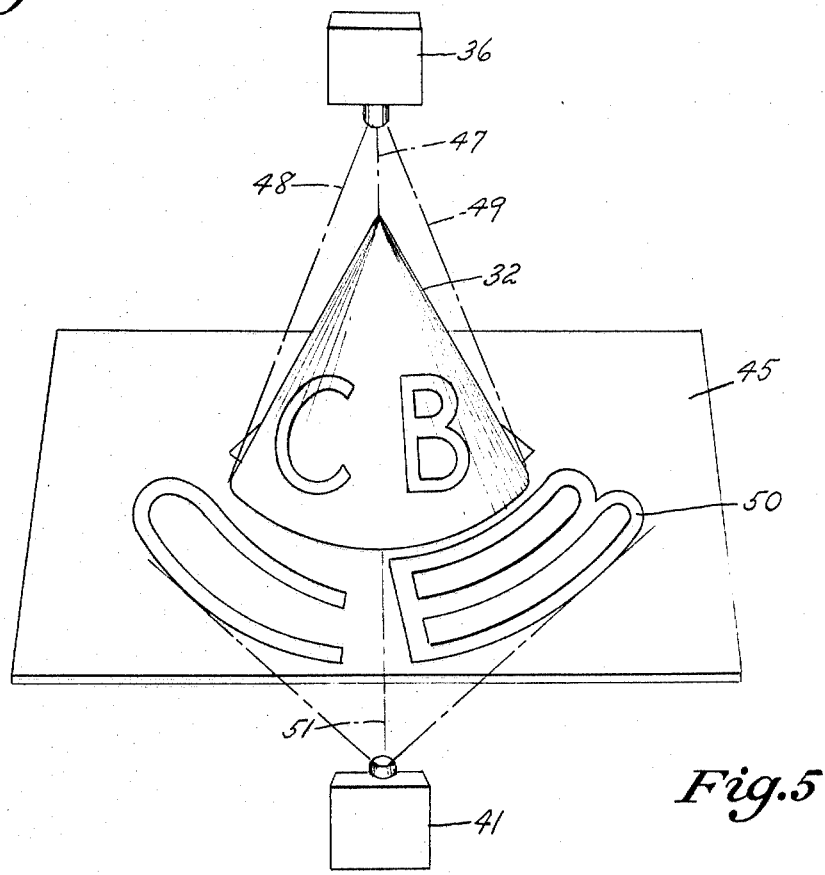
FIG. 5 is a schematic perspective view of the equipment used to form an anamorphic image in accordance with the method of a third illustrative embodiment of the invention.

The image projected from the projector 36 is represented in FIG. 5 by an axial ray 47 and two side rays 48 and 49. This image is reflected from the entire conical surface of the cone 32 to form an anamorphic reproduction 50 of the image on the upper side of the translucent surface 45. The light from the camera 41, represented by an axial ray 51, approaches the surface 45 from the opposite or lower side in coaxial relationship with the axes of the cone 32 and the projected axial ray 47. The camera 41 photographs the anamorphic reproduction 50 appearing on the lower side of the surface 45, and the thus produced film is developed and printed through the use of conventional techniques.

The various illustrated embodiments of the invention rely on controlled interactions between two systems of optics: dioptrics and catoptrics. A true image of the subject is projected by a dioptric system, the light undergoing refraction as it is directed toward the cylindrical or conical mirror. Here catoptrics takes over, and the image is reflected from the mirrored cylinder or cone to create the anamorphosis on the planar surface. The anamorphic image describes an arc of 180° or more around the cylindrical mirror and a full 360° around the conical mirror. A further step on the interaction of catoptrics and dioptrics takes place when the image is photographed by the dioptric system in the camera. The resulting film exhibits precise photographic fidelity between the anamorphosis and the original subject and enables the restoration of the image to its true form by a cylindrical or conical mirror with equal precision.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. A method for photographically preparing anamorphic pictures, comprising, in combination:
   projecting a true photographic image of the picture to be prepared through a dioptric lens system onto a curved reflective surface having an axis;
   maintaining the axial ray of the projected image substantially perpendicular to the axis of the curved reflective surface;
   reflecting an anamorphic reproduction of the image from the curved surface such that the reflected reproduction lies in a plane normal to said axis; and
   photographing the anamorphic reproduction from a direction parallel to the axis of said surface.

2. A method for photographically preparing anamorphic pictures, comprising, in combination:
   projecting a true image of the picture to be prepared through a dioptric lens system onto a curved reflective surface having an axis which is substantially perpendicular to the projected axial ray;
   maintaining the axial ray of the projected image substantially perpendicular to the axis of the curved reflective surface;
   reflecting an anamorphic reproduction of the image from the curved surface such that the reflected reproduction lies in a plane normal to said axis; and
   photographing the anamorphic reproduction from a direction parallel to the direction of said axis.

3. A method as defined in claim 2, in which the anamorphic reproduction is reflected from a conical reflective surface.

4. A method for photographically preparing anamorphic pictures comprising, in combination:
   projecting a true image of the picture to be prepared through a dioptric lens system onto a right cylindrical reflective surface;
   maintaining the axial ray of the projected image substantially perpendicular to the axis of the cylindrical reflective surface;
   reflecting an anamorphic reproduction of the image from the cylindrical reflective surface such that a portion of the reflected reproduction lies in a plane normal to said axis; and
   photographing that portion of the anamorphic reproduction which lies in said plane.

5. A method as defined in claim 4, in which the anamorphic reproduction is photographed from a direction parallel to the axis of the cylindrical surface.

6. A method as defined in claim 4, in which the axial ray of the projected image is maintained in a direction which meets the axis of the cylindrical surface at an angle of not less than about 70° and not more than about 110°.

7. A method for photographically preparing anamorphic pictures comprising, in combination:
   projecting a true image of the picture to be prepared through a dioptric lens system onto a right cylindrical reflective surface;
   maintaining the axial ray of the projected image in a direction which meets the axis of the cylindrical reflective surface at an angle of not less than about 70° and not more than about 110°;
   reflecting an anamorphic reproduction of the image from the cylindrical reflective surface onto a planar surface normal to said axis; and
   photographing the anamorphic reproduction on the planar surface from a direction parallel to the direction of said axis.

8. A method for photographically preparing anamorphic pictures comprising, in combination:
   projecting a true image of the picture to be prepared through a dioptric lens system onto a conical surface having a distinct vertex, the vertex as well as the remaining portion of the conical surface being of reflective material;

reflecting an anamorphic reproduction of the image from the conical surface such that the reflected reproduction lies in a plane normal to the conical axis; and photographing the anamorphic reproduction from a direction parallel to the direction of said axis.

9. A method as defined in claim 8, in which the anamorphic reproduction is photographed from the same direction as that of the projected image as it reaches the conical surface.

10. A method as defined in claim 8, in which the anamorphic reproduction is photographed from a direction opposite to the direction of the projected image as it reaches the conical surface.

11. A method for photographically preparing anamorphic pictures comprising, in combination:
  projecting a true image of the picture to be prepared through a dioptric lens system onto a conical reflective surface;
  reflecting the anamorphic reproduction of the image from the conical surface onto one side of a translucent planar surface normal to the conical axis;
  passing the anamorphic reproduction through said planar surface to its opposite side; and
  photographing said anamorphic reproduction from said opposite side of the planar surface.

12. A method as defined in claim 11, in which the anamorphic reproduction is photographed from a direction parallel to said axis.

13. A method for photographically preparing anamorphic pictures comprising, in combination:
  projecting a true image of the picture to be prepared through a dioptric lens system onto a conical surface having an axis and a distinct vertex, the vertex as well as the remaining portion of the conical surface being of reflective material and the axis being substantially perpendicular to the projected axial ray;
  changing the direction of the projected image such that its axial ray is coaxial with the axis of the conical surface at the time the image reaches said surface;
  reflecting an anamorphic reproduction of the image from the conical surface onto a planar surface normal to said axis; and
  photographing the anamorphic reproduction on the planar surface from a direction parallel to the direction of said axis.

14. A method for photographically preparing anamorphic pictures comprising, in combination:
  projecting a true image of the picture to be prepared through a dioptric lens system onto the conical surface of a right circular cone having a distinct vertex, the vertex as well as the remaining portion of the conical surface being of reflective material and the axis of the cone being substantially perpendicular to the projected axial ray;
  changing the direction of the projected image such that its axial ray is coaxial with the cone at the time the image reaches the conical surface;
  reflecting an anamorphic reproduction of the image from substantially the entire conical surface of the cone such that the reflected reproduction lies in a plane normal to the conical axis; and
  photographing the anamorphic reproduction on the planar surface from a direction parallel to the direction of said axis.

* * * * *